United States Patent [19]

Busking

[11] Patent Number: 5,313,218
[45] Date of Patent: May 17, 1994

[54] ANTENNA ASSEMBLY

[75] Inventor: Erik B. Busking, Den Haag, Netherlands

[73] Assignee: NCR Corporation, Dayton, Ohio

[21] Appl. No.: 962,172

[22] Filed: Oct. 15, 1992

Related U.S. Application Data

[63] Continuation of Ser. No. 633,705, Dec. 24, 1990, abandoned.

[30] Foreign Application Priority Data

Sep. 6, 1990 [GB] United Kingdom ............... 9019486

[51] Int. Cl.$^5$ ............... H01Q 21/240; H01Q 9/004; H01Q 1/520
[52] U.S. Cl. .................. 343/727; 343/853; 343/859
[58] Field of Search ............. 343/727, 725, 745, 793, 343/795, 803, 807, 820, 821, 853, 876, 859; H01Q 1/52, 3/24, 3/26, 9/42, 9/00, 21/24, 21/28, 23/00, 25/00

[56] References Cited

U.S. PATENT DOCUMENTS

| | | | |
|---|---|---|---|
| 4,062,017 | 12/1977 | Thompson | 343/727 |
| 4,395,714 | 7/1983 | Takeda et al. | 343/725 |
| 4,825,220 | 4/1989 | Edward et al. | 343/795 |
| 5,005,023 | 4/1991 | Harris | 343/786 |

FOREIGN PATENT DOCUMENTS

| | | | |
|---|---|---|---|
| 0318665 | 9/1988 | European Pat. Off. | H04B 7/08 |
| 0348187 | 6/1989 | European Pat. Off. | H04B 7/08 |
| 0038308 | 2/1988 | Japan | H01Q 21/24 |
| 1411704 | 5/1973 | United Kingdom | H01Q 7/08 |

OTHER PUBLICATIONS

UTICA Communications Corporation Advertisment, Gizmotchy-2 in 1-C-B Beam, 1 page, 1965.
Book, *Principles of Antenna Theory*, by Kai Fong Lee, pp. 114 & 115, (New York; John Wiley and Sons, 1984).

*Primary Examiner*—Rolf Hille
*Assistant Examiner*—Peter Toby Brown
*Attorney, Agent, or Firm*—Elmer Wargo

[57] ABSTRACT

An antenna assembly includes a dipole antenna (D1, D2) and a monopole antenna (C1) having substantially perpendicular polarization directions. The dipole antenna (D1, D2) is provided with a balun (E1, E2) a portion (E1) of which serves as a backplane for a microstrip transmission line (G0, G1, G2) which transmits RF signals. The microstrip transmission line includes a first portion (G0) connected to a coaxial feed cable (F), a second portion (G1) having its ends respectively connected by a first switch (A) to the monopole antenna (C1) and a second switch (B) to the balun portion (E1) and a third portion (G2). When the switches (A, B) are closed to render the monopole antenna (C1) operative, the third portion (G2) serves to detune the dipole antenna (D1, D2). The assembly may be formed as a two-sided printed circuit board.

15 Claims, 3 Drawing Sheets

ANTENNA ASSEMBLY

This is a continuation of co-pending application Ser. No. 07/633,075 filed on 24 Dec. 1990 and now abandoned.

BACKGROUND OF THE INVENTION

This invention relates to antenna assemblies for use in radio communication systems.

It is known in radio communication systems to provide an antenna diversity capability, whereby two antennas are available. The quality, for example, of the received signal strength of the signals received by the two antennas may be compared, and the antenna having the better received signal strength selected for use. Such an arrangement is disclosed in European Patent Application No. 0 318 665.

It has recently been proposed to utilize radio waves for communication in a wireless local area network (LAN). A suitable frequency band for a radio LAN lies in the 902 to 928 MHz range. However, due to multipath fading and interference, it is found that the probability of data errors is unacceptable if only one antenna is used for the network station. Thus, it is desirable to utilize two alternatively selectable antennas.

SUMMARY OF THE INVENTION

It is the object of the present invention to provide an antenna assembly having two antennas which are selectively operable and which is of compact construction.

Therefore, according to the present invention, there is provided an antenna assembly comprising:

first and second antennas having different polarization directions; and switching means to render said first antenna or said second antenna selectively operative;

said switching means also being effective to detune said first antenna when said second antenna is rendered operative.

This invention also relates to a method of transmitting data frames in a local area network including a plurality of local area network stations, each station comprising:

transceiver means to operate on a wireless transmission; and first and second antennas having different polarization directions;

said method comprising the steps of:
(a) selecting one of said first and second antennas to be used; and
(b) detuning the remaining one of said first and second antennas not selected at step (a).

It will be appreciated that an antenna assembly according to the invention can be implemented as a compact construction since the first and second antennas can be closely positioned with the detuning provision assisting towards maintaining substantial perpendicularity between the antenna polarizations.

Two embodiments of the present invention will now be described by way of example, with reference to the following description, claims, and drawing.

DESCRIPTION OF THE PREFERRED EMBODIMENTS

Figure 1:
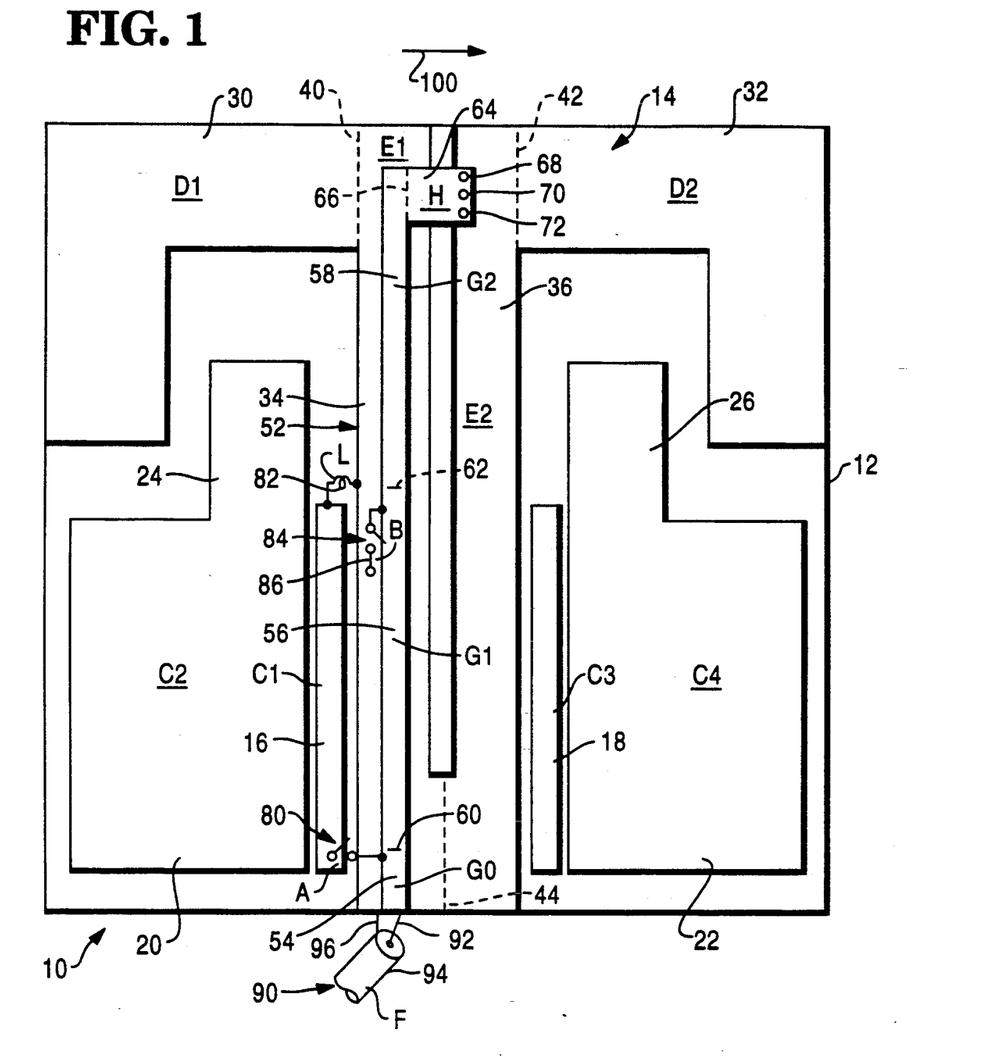
FIG. 1 is a top view, partially in schematic form, of a first embodiment of an antenna assembly according to the invention.
Figure 2:
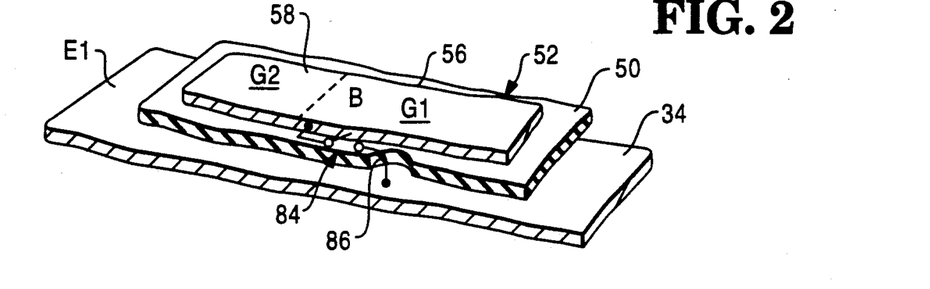
FIG. 2 is a perspective view of a cut-away portion of the antenna assembly shown in FIG. 1.

A first embodiment of an antenna assembly according to the invention will be described with reference to FIGS. 1 and 2. Referring first to FIG. 1 there is shown a view of the antenna assembly 10, with certain parts thereof being illustrated only schematically, as an aid to clarity of the drawing. The antenna assembly 10 includes a dielectric substrate 12, on which are provided a generally T-shaped conductive area 14, two conductive strips 16 and 18, indicated by references C1 and C3, and two generally rectangular areas 20 and 22, indicated by references C2 and C4, and having extension portions 24 and 26. The conductive areas may be formed of copper.

The T-shaped conductive area 14 includes two generally L-shaped areas 30 and 32, indicated by references D1 and D2, and two strip shaped areas 34 and 36 indicated by references E1 and E2. The dashed lines 40, 42, and 44 indicate the boundaries of the conductive areas which abut thereon. Overlying the strip-shaped area 34, and separated therefrom by a dielectric layer 50 (FIG. 2), there is provided a conductive strip 52 having a lower portion 54 (as seen in FIG. 1), a central portion 56 and an upper portion 58. The strip portions 54, 56, and 58 are indicated by references G0, G1, and G2 and are bounded by dashed lines 60 and 62. The upper strip portion 58 has an interconnection region 64, indicated by reference H, bounded by dashed line 66, which is separated from the plane of the conductive area 14 by the dielectric layer 50, and which is electrically connected to the underlying conductive strip 36 by conductive leads 68, 70, and 72, which extend through the dielectric layer 50.

In an alternative construction, a printed circuit board could be used as the substrate for the antenna assembly, with the elements D1, D2, E1, and E2 provided on one side thereof, and the elements C1 to C4, G0 to G2, and H provided on the other side thereof.

The conductive strip 16 is connected adjacent one end thereof to the conductive strip 54 by a switch 80, also indicated by reference A. The strip 16 is also connected, at the other end thereof to the conductive strip 34 by an inductor 82, also indicated by reference L. The upper end (as seen in FIG. 1) of the strip portion 56 is connected by a switch 84, also indicated by reference B, and a lead 86 which passes through the dielectric layer 50 (as seen in FIG. 2), with the conductive strip 34. In practice, the switches 80 and 84 would be implemented as electronic switches.

A coaxial feed cable 90, also indicated by reference F, has its inner conductor 92 connected to the lower portion 54 of the conductive strip 52 and its outer conductor 94 connected to the strip-shaped area 34 by a conductor 96.

It should be understood that the antenna assembly 10 implements two antennas having polarization directions which are substantially perpendicular. The first antenna is a dipole antenna consisting essentially of the two L-shaped areas 30 and 32, referred to as D1 and D2. The second antenna is a monopole antenna consisting essentially of the conductive strip 16, referred to as C1. When the switches 80 and 84 (switches A and B) are both open, the dipole antenna is operative and when the switches 80, 84 are both closed, the monopole antenna is operative. Although referred to as a monopole antenna, it will be appreciated by those skilled in the art that such antenna is effective as a dipole antenna, with the monopole portion (essentially the conductive strip 16 (C1)) serving as one dipole element and the feed cable 90 as the other dipole element.

In more detail, the dipole antenna, consisting essentially of the (folded) quarter wavelength dipole elements D1 and D2, incorporates a balun (balanced-to-unbalanced) device consisting essentially of the strips E1 and E2 with the strip E1 also serving as the backplane of the microstrip line (G0, G1, G2)/E1, it being remembered that the conductive strip 52 (G0, G1, G2) is connected to the inner conductor 92 of the coaxial cable 90, and the conductive strip 34 (E1) is connected to the outer conductor 94. Also, the conductive area H interconnects the strips G2 and E2 at their upper ends (as seen in FIG. 1), the strips E1 and E2 are interconnected at their lower ends as indicated by the dashed line 44, the strip E1 is connected to the dipole element D1 as indicated by the dashed line 40, and the strip E2 is connected to the dipole element D2 as indicated by the dashed line 42. Note that the lengths of the elements D1, D2, E1 and E2 are each one-quarter of a wavelength of the relevant radio frequency in free air. As is generally known, where two dipole elements are fed by respective conductors of a coaxial cable or transmission line, a balun device includes an added conductive element (generally, one quarter wavelength) connected to one of the dipole elements, which balances out undesired currents in the conductor feeding the other dipole element. The strip line portion G1 is of an electrical length of one-quarter of a wavelength of the relevant radio frequency due to the presence of the dielectric material 50 (dielectric constant greater than 1). The physical length of G1 is therefore less than that of the other one-quarter wavelength elements mentioned, namely D1, D2, E1 and E2. Also, it should be noted that because of the bent shape of the elements D1 and D2 and the utilization of the upper portions of the elements E1 and E2 as effectively part of the dipole elements D1 and D2, the physical lengths of the dipole elements D1 and D2 are shown in FIG. 1 as less than the physical lengths of the elements E1, E2.

The monopole antenna, consisting essentially of the conductive strip C1, also includes an impedance matching passive monopole element C2 (conductive area 20), which also radiates, and an inductive element L (shown as coil 82). A monopole counterpart element C3 (conductive area 18) and a passive monopole counterpart element C4 (conductive area 22), are also provided to form a symmetrical structure. However, any or all of the elements C2, C3, C4, and L may be omitted depending on performance requirements.

It will be appreciated that both the dipole antenna (essentially D1, D2) and the monopole antenna (essentially C1) can be used for transmitting or receiving, since any antenna can transmit or receive. Since symmetry and radiation patterns are the same for both directions, the subsequent explanation of the antenna assembly 10 will consider the transmit direction only.

With both switches A and B (80 and 84) open, the dipole antenna (essentially D1 and D2) is in operation. The RF energy is provided over the coaxial cable F and transferred over the strip transmission line formed by the strips G0, G1, and G2 and backplane strip E1. The upper end of the strip G2 (as seen in FIG. 1) is connected to the extension region H which is connected to the upper end of the strip E2. Thus, the RF source voltage exists between both ends of E1 and E2 as if the source were located there. The balun E1 and E2 has a high impedance between its ends for differential-mode. The balun also has a high impedance for common-mode, but this mode is substantially not excited by the source, because the microstrip (G0, G1, G2)/E1 transports wave energy to the end at H. When the dipole D1 and D2 is connected in, the ratio between the common-mode impedances of the dipole (low) and balun (high) results in an even lower common-mode voltage. Thus, the RF energy is substantially entirely transferred to the dipole in differential-mode, whereby the antenna assembly radiates an E-field in the direction shown by the arrow 100. In practice, a small amount of energy is transferred to common-mode, but this only slightly affects the polarization.

It will be appreciated that the presence of the counterpart elements C3 and C4 makes the electromagnetic environment of the dipole symmetrical with the respect of the plane of symmetry of the dipole.

When both switches A and B are closed, the monopole antenna (essentially C1) is in operation. The RF energy applied over the coaxial cable F is transferred via the microstrip line G0/E1 through the switch A to the monopole C1. The impedance of the monopole is matched by means of the inductance L (82) and the passive monopole element C2 (20). The switch B prevents any RF energy from being transferred to the dipole D1, D2. The microstrip G1/E1 does not form a load at the switch A because it is a quarter wavelength microstrip line short-circuited by the switch B. Note that, as discussed hereinabove, the physical length of G1 is less than that of the balun element E1. The polarization of the transmitted monopole antenna signal would tend to be disturbed by the presence of the dipole antenna D1 and D2, which acts as a resonator coupled to the monopole antenna. This arises, since, if the dipole antenna D1 and D2 were in tune with the transmitted RF signal, it would pick up RF energy from the monopole antenna, and transmit it with an undesired polarization. According to the present invention, however, the dipole is detuned automatically when the switch B is closed, since the short-circuited microstrip G2/E1 is connected to the dipole, making it resonate at a different frequency, and thus rendering it practically immune to the signals transmitted by the monopole antenna. It will be appreciated that the switch B has three functions: when on, it excludes RF energy from the dipole D1, D2; it creates a high impedance of G1 at the location of the switch A and it detunes the dipole D1 and D2.

It will be appreciated that the switches A and B have inherent inductance. The inductance of the switch A is accounted for in the impedance matching of the monopole antenna. The inductance of the switch B may be tuned out by a series-connected capacitor (not shown in FIG. 1).

Some optimizations of the above-described embodiment will now be mentioned. Firstly, when the monopole antenna is the main transmitting antenna, the impedance of the switch B can be arranged to permit a small amount of energy to pass to the dipole antenna, such that a correction signal is transmitted having an assist in making the polarization of the total transmitted signal approximately perpendicular to that of the dipole.

As another optimization, where the switch B effects a full short-circuit, as in the FIG. 1 embodiment, the position of the switch B may be varied along the length of the strip 52 to deviate from a quarter wavelength in order to provide a desired impedance at its connection point with the switch A.

It is also possible to effect the above-mentioned two optimizations simultaneously, whereby both the impedance and location of the switch B can be varied. Thus, when the impedance of the switch B is varied, the impedance of G1 at the connection with switch A is not infinite but has a finite value (mainly reactive with a small real part resulting from the "leak" to the dipole and due to reactance in switch B). This has two effects: first, in matching of the monopole antenna, this has to be accounted for, and second, the amplitude and phase of the energy radiated by the monopole antenna are slightly changed. In optimizing, both these effects are taken into account, resulting in a properly matched antenna with maximal difference in polarization between monopole and dipole operation (attainable with these optimization parameters). As a further option the length of the microstrip G2/E2 can be varied to assist in transmitting a proper correction signal, as well as detuning the dipole.

Although the first embodiment was described as being constructed on an insulating substrate, or as a two-sided printed circuit board, it will be appreciated that other constructions are possible for the antenna assembly 10. Thus the dipole D1 and D2 and monopole C1 could be formed as rods, while the microstrip line (G0, G1, G2)/E1 could be formed by a coaxial cable. Alternatively the antenna assembly could be constructed from a dielectric (plastics) box having interior metalizations to form the antenna elements.

Figure 3:
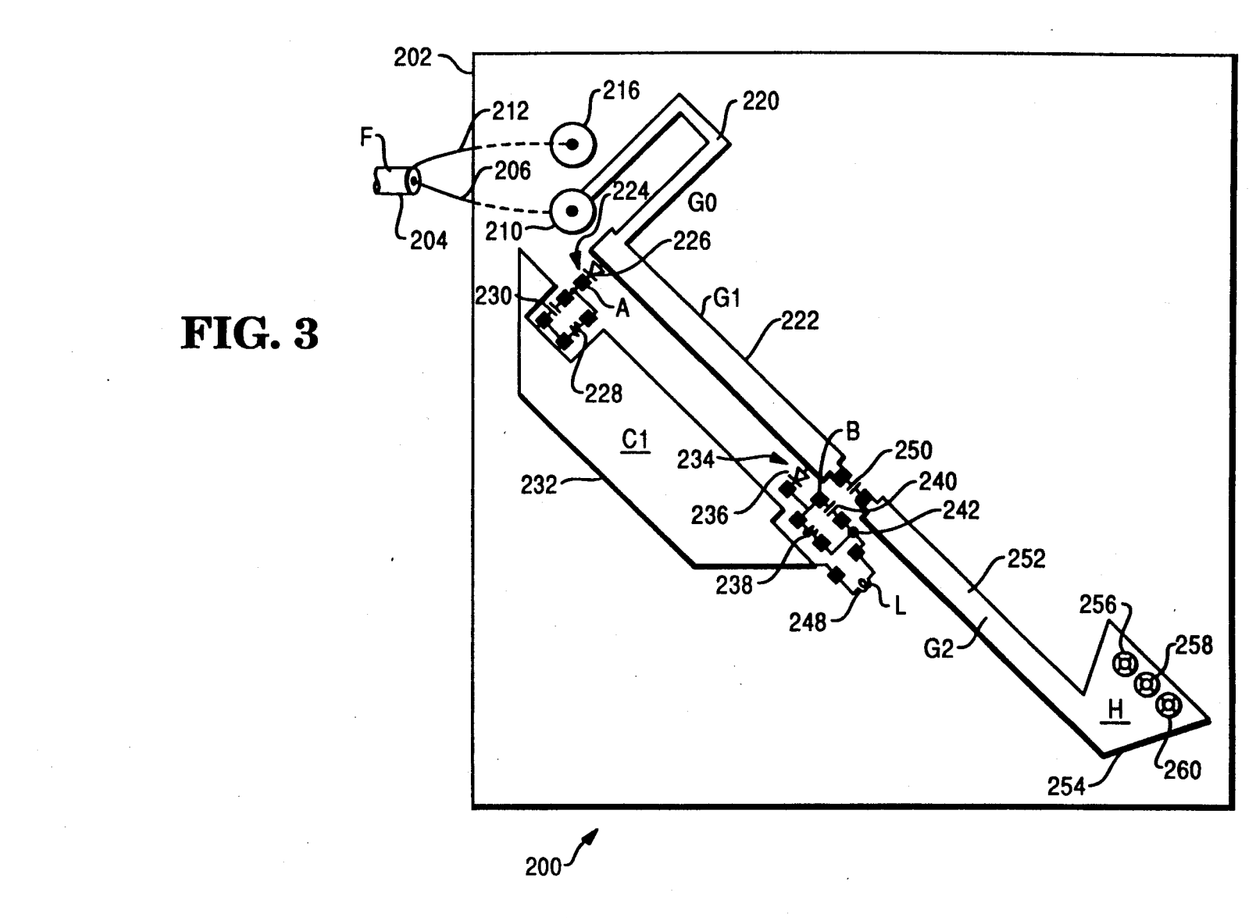
FIG. 3 is a top view, partially in schematic form, of a first portion of a second embodiment of an antenna assembly according to the invention.
Figure 4:
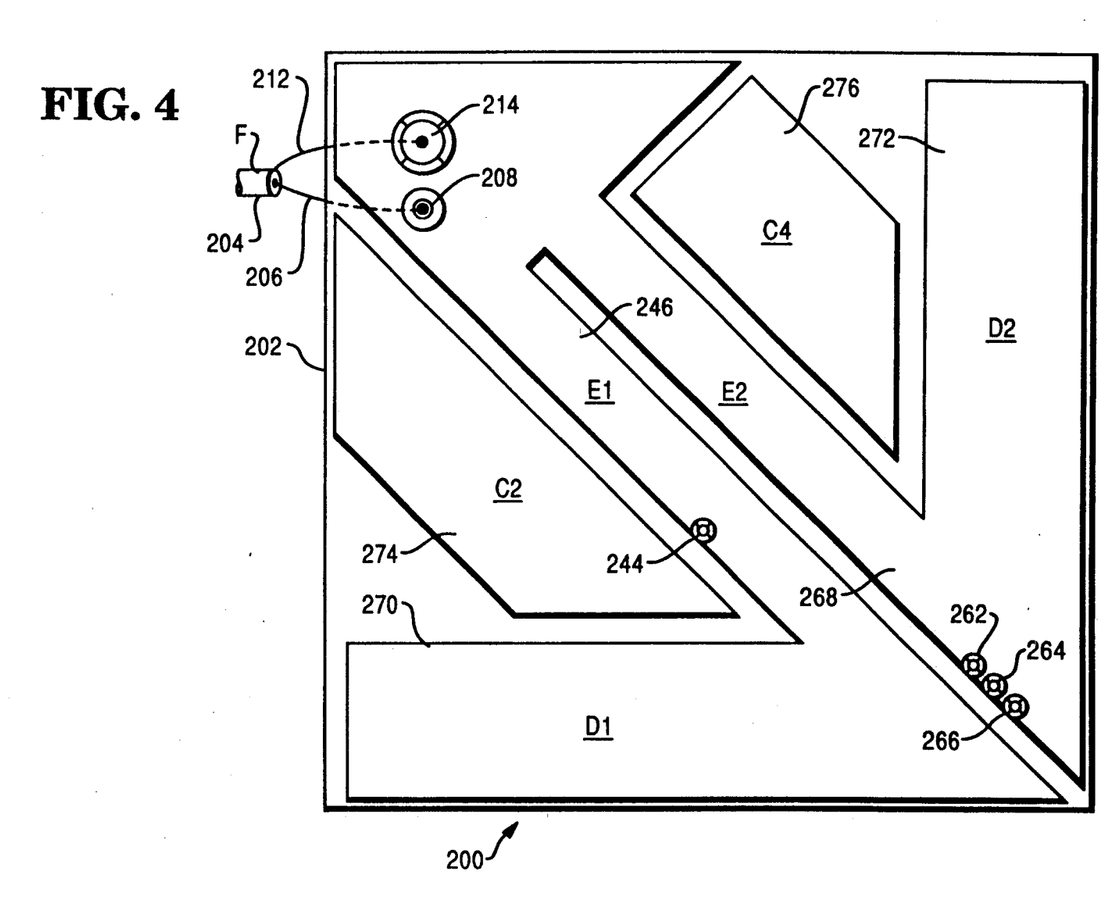
FIG. 4 is a sectional view of a second portion of the second embodiment of an antenna assembly according to the invention.

A second embodiment of an antenna assembly 200 according to the invention, incorporating certain of the optimizations discussed hereinabove, will now be described, with reference to FIGS. 3 and 4. The antenna assembly 200 is formed on two sides of a printed circuit board 202, which acts as a dielectric substrate, as in one form of the first embodiment. FIG. 3 is a top view of the board 202, showing the conductive areas formed thereon, and resistors, capacitors and an inductor indicated schematically but which would be provided as discrete components, mounted on the printed circuit board 202. FIG. 4 is a view of the other side of the printed circuit board 202, showing the conductive areas provided thereon, it being appreciated that in the formed antenna assembly 200, FIG. 3 overlies FIG. 4 in the orientation shown with the dielectric material of the board 202 lying between the conductive areas shown in FIG. 3 and 4.

To assist in comparing the components of the second embodiment with corresponding components of the first embodiment, the letter references for switches A and B, monopole C1, passive monopole C2, passive monopole counterpart C4, dipole D1 and D2, balun E1 and E2, cable F, interconnection H, and inductor L are also utilized in FIGS. 3 and 4. In the second embodiment, sufficient symmetry is achieved without the use of a monopole counterpart element C3.

With the above in mind, the antenna assembly 200 will now be described. A coaxial cable 204 (cable F) has its inner conductor connected via a lead 206 which extends from the lower side of the board 202, through a hole (not shown) in a conductive area 208 on the lower side of the board 202 to be soldered to a contact area 210 (FIG. 3) provided on the upper side of the board 202. The outer conductor of the cable 204 is connected by a lead 212 which extends through a hole (not shown) in the conductive contact area 214, and through the material of the board 202 to contact the conductive area 216 to which the end of the lead 212 is soldered.

Thus, the inner conductor of the cable 204 is electrically connected to the contract area 210, which connects with a generally U-shaped strip 220, forming the strip G0. The strip 220 interconnects with a straight strip 222, forming the strip G1. Adjacent the junction of the strips 220 and 222, is provided a switch 224 (switch A), including a diode 226, connected to a parallel combination of a resistor 228 and a capacitor 230, which are individually connected to a conductive area 232, forming the monopole C1. The other end of the strip 222 is connected to a switch 234 (switch B) which includes a diode 236 connected to a parallel combination of a resistor 238 and a capacitor 240, which are commonly connected to a contact area 242 which extends through the board 202 to contact a conductive area 244 on the lower side of the board, which connects with a conductive area 246 (balun element E1).

On the upper side of the board 202 (FIG. 3), the contact area 242 is connected to one end of an inductor 248 (inductance L) the other end of which is connected to the monopole conductive area 232.

The conductive strip 222 is also connected via a capacitor 250 to a conductive strip 252, forming the strip G2, the other end of which connects to a conductive area 254 (interconnection H). The conductive area 254 is connected by conductive contact areas 256, 258, and 260, which extend through the board 202 to connect with contact areas 262, 264, and 266 which are connected to a conductive area 268, forming balun element E2.

On the lower side of the board 202 (FIG. 4) the conductive area 246 connects with a conductive area 270, which forms dipole element D1, and the conductive area 268 connects with a conductive area 272 forming dipole element D2. A conductive area 274 forms the passive monopole C2, and a conductive area 276 forms the passive monopole counterpart C4.

The operation of the second embodiment will now be described. It should be understood that the switches 224 and 234 (switches A and B) are controlled by DC voltages which are applied to the inner conductor of the cable 204, and which are fed via the lead 206 to the contact area 210 (FIG. 3). When a positive voltage is applied between the inner and outer conductor of the cable 204, the diodes 226 and 236 are rendered conductive (switches A and B are closed), and the monopole antenna C1 is operative. The DC current flows via the lead 206, contact area 210, strip 220, diode 226, resistor 228, monopole element C1, coil 248, contact area 242, contact area 244 (FIG. 3) to the balun element E1 and then via contact area 214 and lead 212 back to the outer conductor of the cable 204. RF signals are now transferred between element G0 and the monopole element C1.

Also, when a positive DC voltage is applied between the inner and outer conductor of the cable 204, the switch 234 (switch B) is rendered conductive, since the diode 236 is forward biased. Thus, DC current flows from the inner conductor of the cable 204, through the conductive strips G0 and G1, the diode 236, the resistor 238, the contact areas 242 and 244, the conductive element E1, the contact areas 214, 216 and then back via the lead 212 to the outer conductor of the cable 204. Also, RF signals passing through microstrip line G1/E1 are substantially short-circuited, yielding a low energy transfer to the dipole D1 and D2 and an almost total reflection of the signal over G1/E1 in the opposite direction, back to switch A. Also, as in the first embodiment, the substantially short-circuited microstrip G2/E1 is connected to the dipole D1 and D2, thereby detuning it.

When a negative DC voltage is applied between the inner and outer conductors of the cable 204, only a small leakage current will flow through the diodes 226 and 236 which are considered to be in the OFF state. RF energy transferred between G0 and C1 will be low, whereas between G0 and G1 it will be high, such that substantially all RF energy flows to dipole D1, D2, with the capacitor 250 acting as a low impedance to such RF energy.

It will be appreciated that the capacitor 250 acts as an isolator for DC voltages. For RF signals, it acts as a conductor and/or tuning element, as discussed hereinabove in connection with the opitimization possibilities for the first embodiment. It will also be appreciated that the coil 248 serves to conduct DC to enable the diode 226 to be biased, and also acts as an inductor L for RF signals, thereby assisting in impedance matching for the monopole antenna.

It should be understood that when the antenna assembly 200 is utilized in a radio LAN, transmitting is effected only with the dipole antenna to prevent high RF current from damaging the diodes 226, 236. In the receive mode, either antenna may be used.

Although the described antenna assemblies are suitable for use in radio LANS, their use is not restricted thereto, and the antenna assemblies may be employed generally in radio communication systems.

With regard to the physical construction, an epoxy/glass printed circuit board with surface mounted components would be suitable for RF frequency bands between about 500 MHz and 1500 MHz. Above these frequencies teflon/glass may be used up to about 3 GHz. Below these frequencies a physical construction using rods and coaxial cable may be used, rather than a printed circuit board construction.

To summarize this invention in claim-like language, it relates to an antenna assembly comprising:
first (D1 and D2) and second antennas (C1) having different polarization directions; and
switching means (A, B) to render said first antenna (D1, D2) or said second antenna (C1) selectively operative;
said switching means also being effective to detune said first antenna (D1, D2) when said second antenna (C1) is rendered operative.
The switching means includes:
detuning means (G2/E1) for detuning said first antenna;
said first antenna (D1, D2) being a dipole antenna;
said second antenna (C1) being a monopole antenna; and
said switching means, when operative, being effective to couple said detuning means to said dipole antenna.
The monopole antenna has first and second ends; and
said switching means includes first and second switching devices (A, B) located adjacent to the first and second ends of said monopole antenna.
The dipole antenna includes first and second dipole elements (D1, D2), and in which:
said antenna assembly includes:
transmission line means (G0, G1, G2)/(E1), H) to supply signals to be transmitted to said first and second dipole elements (D1, D2).
The transmission line means includes:
first (G0/E1), second (G1/E1), and third (G2/E1) transmission line portions including, respectively, first (G0), second (G1), and third (G2) conductive strips;
a fourth (E1) conductive strip; and
dielectric material separating said fourth conductive strip from said first, second, and third conductive strips;
said fourth conductive strip forming a balun device with respect to said first, second, and third conductive strips;
said signals to be transmitted being coupled to said first transmission line portion;
said first and second switching devices being located on opposed ends of said second transmission line portion; and
said third transmission line portion serving to detune said dipole antenna.
The dielectric material is a printed circuit board and the first and second dipole elements, said monopole antenna, and said fourth conductive strip are electrically conducting regions on said printed circuit board.
The antenna assembly also includes a passive monopole matching and radiating element provided as a conductive area on said printed circuit board.
The first switching device (A) comprises:
a first diode (226) having first and second terminals with said first terminal connected to said second conductive strip (G1); and
a first capacitor (230) and a first resistor (228) connected in parallel between said second terminal of said first diode and said monopole antenna (C1).
The second switching device also comprises:
a second diode (236) having first and second terminals, with said first terminal of said second diode connected to said second conductive strip (G1);
a second capacitor (240) and a second resistor (238) connected in parallel between said second terminal of said second diode and said fourth conductive strip (E1); and
a third capacitor connected between said second conductive strip (G1) and said third conductive strip (G2).
The antenna assembly also includes an inductor coupled between said fourth conductive strip (E1) and said monopole antenna (C1), and also includes a coaxial feed cable having an inner conductor coupled to said first conductive strip (G0) and an outer conductor coupled to said fourth conductive strip (E1).

While the form of the invention shown and described herein is admirably adapted to fullfill the object primarily stated, it is to be understood that it is not intended to confine the invention to the form or embodiment disclosed herein, for it is susceptible of embodiment in various other forms within the scope of the appended claims.

What is claimed is:
1. An antenna assembly comprising:

first and second antennas having different polarization directions, said first antenna being a dipole antenna having first and second dipole elements, and said second antenna being a monopole antenna having first and second ends;

a transmission line connected between a feed line and said first antenna, said feed line having an outer conductor and an inner conductor; said transmission line including:

first, second, and third transmission line portions including, respectively, first, second, and third conductive strips;

a fourth conductive strip; and dielectric material separating said fourth conductive strip from said first, second, and third conductive strips, said fourth conductive strip forming a balun device with respect to said first, second, and third conductive strips;

a switching means having first and second switching devices for direction signals to said first or second antenna; said switching devices having open and closed positions, said second switching device connected between said fourth conductive strip and said second transmission line portion, and said first switching device connected between said first end of said second antenna and said first transmission line portion;

said second switching device, when closed, coupling said second and third portions of said transmission line to the outer conductor of said feed line via said fourth conductive strip thereby detuning said first antenna; and said first switching device, when closed, coupling said signals to said second antenna via said first portion of said transmission line.

2. The antenna assembly as claimed in claim 1 in which said dielectric material is a printed circuit board and in which said first and second dipole elements, said monopole antenna, and said fourth conductive strip are electrically conducting regions on said printed circuit board.

3. The antenna assembly as claimed in claim 2 further including a passive monopole matching and radiating element provided as a conductive area on said printed circuit board.

4. The antenna assembly as claimed in claim 3 in which said first switching device comprises:

a first diode having first and second terminals with said first terminal connected to said first conductive strip; and a first capacitor and a first resistor connected in parallel between said second terminal of said first diode and said monopole antenna; and in which said second switching device comprises:

a second diode having first and second terminals, with said first terminal of said second diode connected to said second conductive strip;

a second capacitor and a second resistor connected in parallel between said second terminal of said second diode and said fourth conductive strip; and a third capacitor connected between said second conductive strip and said third conductive strip.

5. The antenna assembly as claimed in claim 4 further including an inductor coupled between said fourth conductive strip and said monopole antenna.

6. The antenna assembly as claimed in claim 5 wherein said feed line is a coaxial feed cable having said inner conductor coupled to said first conductive strip and said outer conductor coupled to said fourth conductive strip.

7. An antenna assembly comprising:

a dipole antenna for polarizing a signal in one direction;

a monopole antenna for polarizing said signal in a different direction;

a feed line;

a transmission line having first, second and third transmission line portions connected between said feed line and said dipole antenna for supplying said signal from said feed line to said dipole or said monopole antenna; said feed line having an outer conductor and an inner conductor, said transmission line also having:

first, second, and third conductive strips associated with said first, second, and third transmission line portions, respectively;

a fourth conductive strip;

dielectric material separating said fourth conductive strip from said first, second, and third conductive strips;

said fourth conductive strip forming a balun device with respect to said first, second, and third conductive strips;

said third transmission line portion having an electrical length different than the electrical length of the balun device;

a switching device having first and second switches, said second switch connected between said fourth conductive strip and said second transmission line portion, and said first switch connected between said monopole antenna and said first transmission line portion;

said inner conductor of said feed line being coupled to said first transmission line portion of said transmission line;

said second switch, when active, coupling said second and said third transmission line portions to the outer conductor of said feed line via said fourth conductive strip thereby enabling said third portion of said transmission line to detune said dipole antenna; and said first switch, when active, directing said signal from said transmission line to said monopole antenna.

8. The antenna assembly as claimed in claim 7 wherein said first antenna and said second antenna are receptive to the same signal frequency.

9. The antenna assembly as claimed in claim 8 wherein said antenna assembly is constructed on a printed circuit board and the first and second antennas are printed circuit elements.

10. An antenna assembly comprising:

first and second antennas laterally disposed on a planar surface and each having different polarization directions; said first antenna having first and second elements;

a feed line having an inner and an outer conductor for supplying signals to said antennas;

a transmission line having first, second, third, and fourth transmission line portions; said fourth transmission line portion disposed between said first and second elements and connected to said outer conductor; said first, second, and third transmission line portions connected in series, with said third transmission line portion connected to said fourth transmission line portion, and with said first transmission line portion connected to said inner conductor;

a switching means having first and second switching devices;

said second switching device connected between said second transmission line portion and said fourth transmission line portion; said second switching device, when closed, coupling said second and third transmission line portions to said outer conductor via said fourth transmission line portion thereby enabling said third transmission line portion to detune said first antenna; and said first switching device connected between said first transmission line portion and said second antenna; said first switching device, when closed, coupling said signals to said second antenna via said first transmission line portion.

11. The antenna assembly as claimed in claim 10 wherein said fourth transmission line portion forms a balun device with respect to said first, second and third transmission line portions and is separated from said first, second and third transmission line portions by a dielectric material.

12. The antenna assembly as claimed in claim 11 wherein said first antenna is a dipole antenna, and said second antenna is a monopole antenna.

13. The antenna assembly as claimed in claim 12 wherein said dielectric material is a printed circuit board and in which said dipole antenna, said monopole antenna, and said fourth transmission line portion are conducting regions on said printed circuit board.

14. The antenna assembly as claimed in claim 13 further including a passive monopole matching and radiating element provided as a conductive area on said printed circuit board.

15. A method of transmitting data in a local area network, including a plurality of local area network stations, each station comprising:

transceiver means for operating in a wireless environment;

first and second antennas having different polarization directions, said first antenna being a dipole antenna and said second antenna being a monopole antenna; and a transmission line for supplying said data from said transceiver means to said first and second antennas;

said method comprising the steps of:
(a) operating a switching device in a first position to enable said first antenna to be used with said transceiver means;
(b) operating said switching device in a second position to enable said second antenna to be used with said transceiver means; and
(c) using said switching device to detune said first antenna making the first antenna resonate at a frequency different from said second antenna when said switching device is switched to said second position.

* * * * *

UNITED STATES PATENT AND TRADEMARK OFFICE
CERTIFICATE OF CORRECTION

PATENT NO. : 5,313,218
DATED : May 17, 1994
INVENTOR(S) : Erik B. Busking

It is certified that error appears in the above-indentified patent and that said Letters Patent is hereby corrected as shown below:

Column 9, line 20, "direction" should be --directing--.

Signed and Sealed this

Seventh Day of February, 1995

Attest:

BRUCE LEHMAN

*Attesting Officer*  *Commissioner of Patents and Trademarks*